US005148590A

United States Patent [19]

Wu

[11] Patent Number: 5,148,590

[45] Date of Patent: Sep. 22, 1992

[54] PORTABLE CHAIN DISASSEMBLING DEVICE

[76] Inventor: Rong C. Wu, No. 103, Sec. 1, Chung Yi Rd., Tainan, Taiwan

[21] Appl. No.: 816,757

[22] Filed: Jan. 2, 1992

[51] Int. Cl.[5] ............................................ B23P 19/04

[52] U.S. Cl. ........................................ 29/257; 29/251; 29/270; 29/281.1

[58] Field of Search ................. 29/251, 256, 257, 270, 29/281.1

[56] References Cited

U.S. PATENT DOCUMENTS 1,000,867 8/1911 Widmayer ............................ 29/257
1,365,559 1/1921 Starks .................................. 29/257
1,469,594 10/1923 Harley .................................. 29/257
3,234,634 2/1966 Johnson et al. ....................... 29/257
3,237,291 3/1966 Kelso .................................... 29/257

*Primary Examiner*—J. J. Swann
*Attorney, Agent, or Firm*—Hedman, Gibson & Costigan

[57] ABSTRACT

A chain disassembling device. The chain disassembling device has a body having a first wall, a second wall connected perpendicularly to the first wall, and a third wall connected perpendicularly to the second wall, each having a threaded hole. A threaded stem having an pushing end moves forth and back in the threaded hole of the first wall, so that the pushing end pushes a chain pin out of chain plates.

1 Claim, 4 Drawing Sheets

PORTABLE CHAIN DISASSEMBLING DEVICE

BACKGROUND OF THE INVENTION

The present invention relates to a portable chain disassembling device.

For the past few years, bicycle travel has been getting more and more popular because it provides a chance to have sight-see and exercise at the same time. During long-distance bicycle travel, troubles, e.g., flat tires and/or the chain coming off the sprockets, might happen to the bicycle, although the bicycle is checked and maintained before travel. To obviate the tire troubles, portable pumps and patching tools have been devised.

In regard to the chain problem, a chain increases greater than it's factory length because of tension and wear after a few months' operation. In such a case, the chain may come off the sprocket often. To solve this problem, a new chain is not needed; rather, a link needs to be removed from the chain, so that the chain will no longer be loose on the sprockets. Furthermore, after being subject to long-term tension, the chain might be somewhat too long to match 1 with the sprockets. Resultantly, the chain comes off the sprockets all the time. Another link needs to be removed from the chain. In fact, a few links might be disassembled from the chain before a new chain is needed. Therefore, a portable chain disassembling device is needed to solve this problem, particularly when it happens during long-distance travel.

SUMMARY OF THE INVENTION

The present invention is intended to provide a portable chain disassembling device. The chain disassembling device has a body having a first wall defining a threaded hole, a second wall defining a threaded hole and residing perpendicularly to the first wall, and a third wall defining two threaded holes and residing perpendicularly to the second wall. A stem has a threaded matching the threaded hole of the first wall and a pushing end moving forth and back when rotated, so that the pushing end urges a chain pin out of chain plates. 11 Additional objects, if not specifically set forth herein, will be readily apparent to those skilled in the art from the detailed description of embodiments below, with reference of the accompanying drawings.

DETAILED DESCRIPTION OF THE PREFERRED EMBODIMENT

The present invention is to be understood by description of the preferred embodiment in relation to the drawings.

Figure 1:
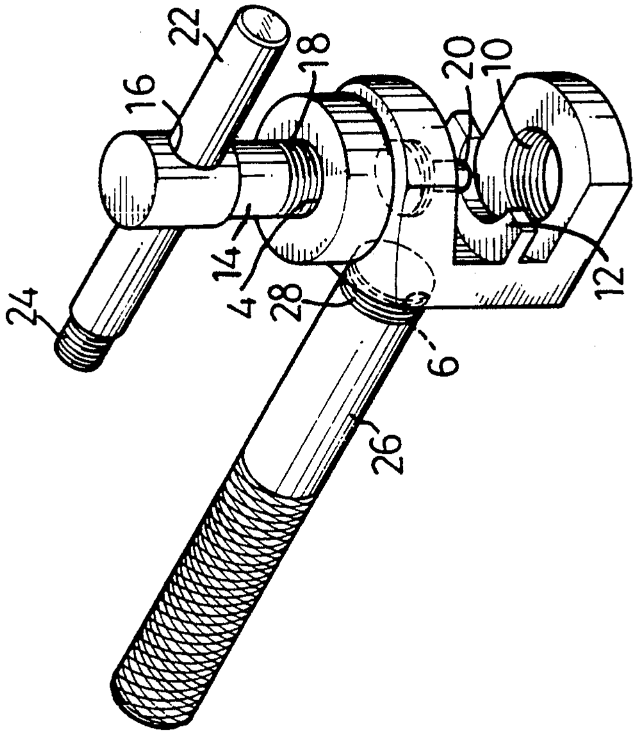
FIG. 1 is a perspective view of a chain disassembling device in accordance with the present invention.
Figure 2:
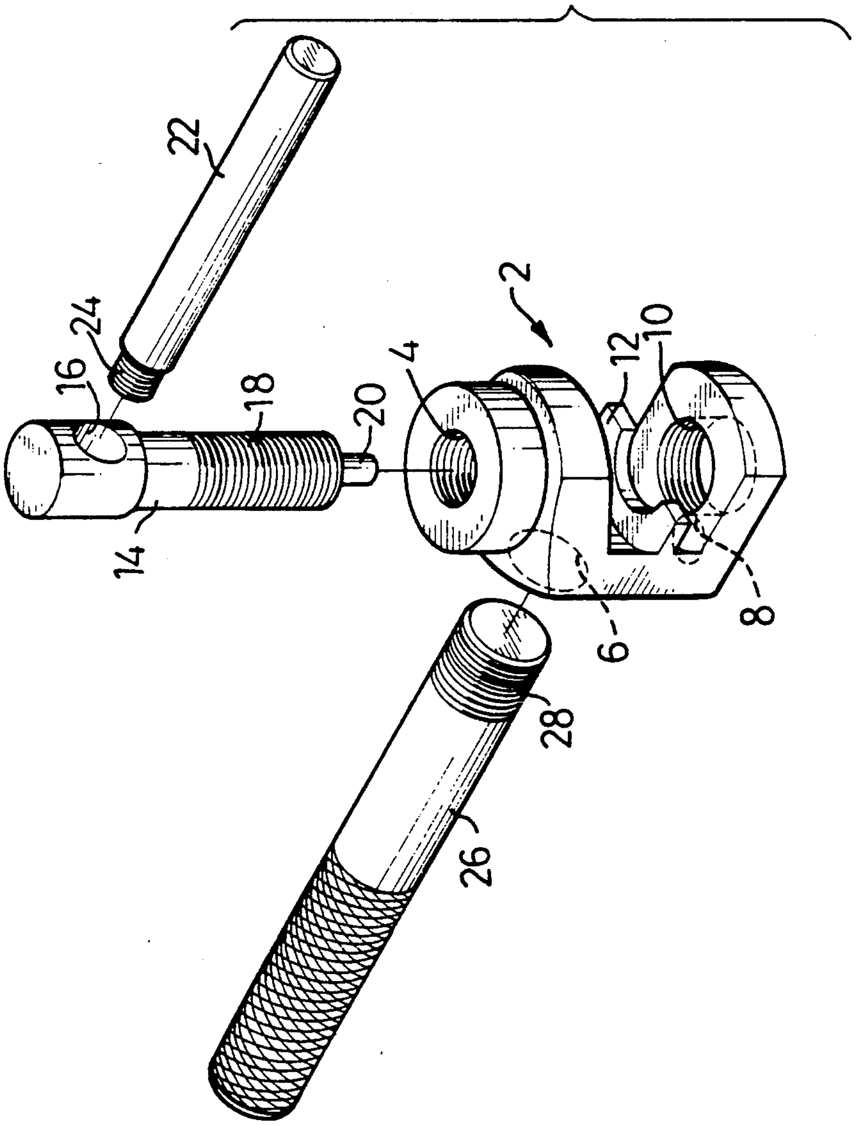
FIG. 2 is an exploded view of a chain disassembling device in acccordance with the present invention.

Referring to the drawings and particularly to FIGS. 1 and 2, a chain disassembling device has a body 2. The body 2 has a first wall defining a threaded hole 4, a second wall defining a threaded hole 6 and residing perpendicularly to the first wall, and a third wall defining threaded holes 8 and 10 and residing perpendicularly to the second wall. A positioning element defining two teeth 12 is formed on the second wall parallel to and between the first and third walls.

A stem 14 has a first end defining a hole 16 extending perpendicular thereto, a middle portion defining a thread 18, and a second end defining a pushing rod 20 extending coaxially therefrom. The threaded hole 4 mates with the thread 18, so that the pushing rod 20 is moved forth and back when the stem 14 is rotated. A lever 22 defining a threaded end 24 corresponding to the threaded hole 8 is received in the hole 16. A lever 26 defining a threaded end 28 is secured in the threaded hole 6, thereby engaging the lever 26 to the body 2.

Figure 3:
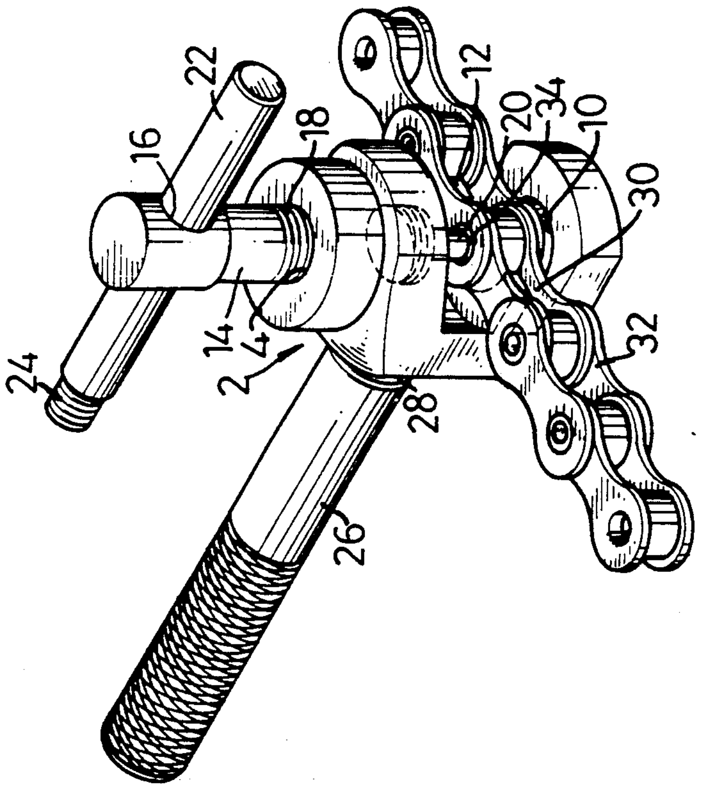
FIG. 3 is a perspective view of a chain disassembling device manipulating a chain in accordance with the present invention.

Referring to FIG. 3, a segment of a chain is shown. The segment is disposed between the first and the second walls. One tooth 12 is received between two inner chain plates while the other one tooth 12 is received between two outer chain plates. Furthermore, the pushing rod 20 is aligned with a chain pin 34 which is to be disassembled from the segment. The levers 22 and 26 are gripped by hands in order to facilitate rotation of the stem 14 so as to move the pushing rod 20 down, thereby urging the chain pin 34 down through the threaded hole 10 from the chain plates 30 and 32.

Figure 4:
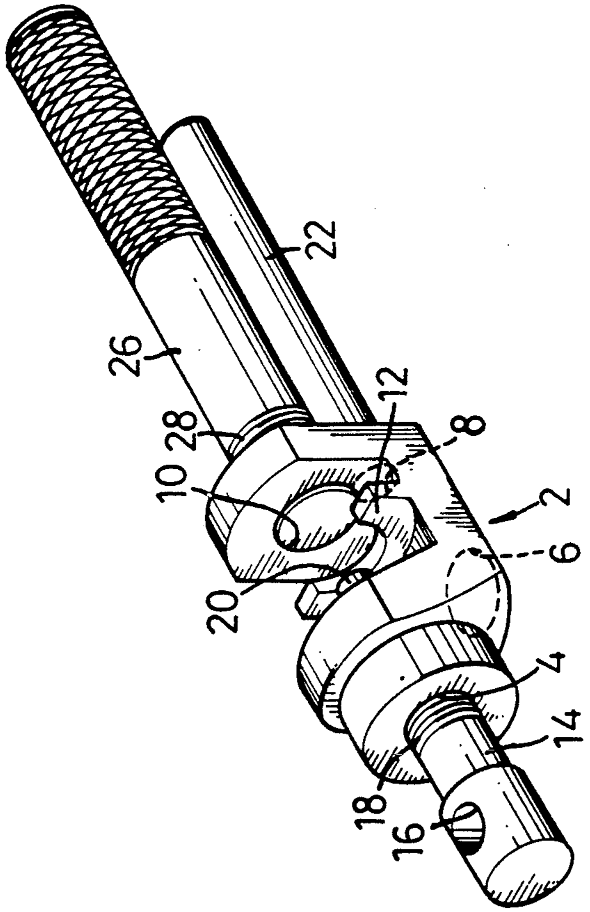
FIG. 4 is a perspective view of a chain disassembling device in a resting position.

Referring to FIG. 4, to reduce space for storage of the chain disassembling device, the threaded ends 24 and 28 are respectively secured in the threaded holes 8 and 10.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A chain disassembling device comprising:

a body comprising:

- a first wall formed with threaded hole;
- a second wall extending perpendicular to said first wall and defining a threaded hole;
- a third wall extending perpendicular to said second wall and defining a first threaded hole and a second threaded hole;
- a positioning element mounted on said second wall, said positioning element extending parallel to and between said first wall and said third wall and defining two teeth;

a stem comprising:

a first end defining a hole transversely extending therethrough;

- a middle portion defining a thread engaged with said threaded hole of said first wall; and
- a second end defining a pushing rod extending co-axially therefrom said pushing rod being aligned with and extendable toward said second threaded hole of said third wall;

a first lever penetrating said hole of said stem for rotating said stem during operation of the device, said first lever defining a threaded end wherein said first level is removable from said stem securable to said first threaded hole of said third wall for storage; and a second lever defining a threaded end securable to said threaded hole of said second wall to act as a handle in operation, said second lever removable from said second wall has been inserted and securable to said second threaded hole of said third wall for storage.

* * * * *